(12) United States Patent
Mulle

(10) Patent No.: US 7,047,872 B2
(45) Date of Patent: May 23, 2006

(54) OPTICAL INTERLOCK FOR APPLIANCE

(75) Inventor: Theodore B. Mulle, New Milford, CT (US)

(73) Assignee: Conair Corporation, Stamford, CT (US)

(*) Notice: Subject to any disclaimer, the term of this patent is extended or adjusted under 35 U.S.C. 154(b) by 281 days.

(21) Appl. No.: 10/664,420

(22) Filed: Sep. 17, 2003

(65) Prior Publication Data

US 2005/0056160 A1    Mar. 17, 2005

(51) Int. Cl.
*A47J 27/08* (2006.01)

(52) U.S. Cl. .................. 99/337; 99/492; 99/510; 241/37.5

(58) Field of Classification Search ........... 99/337, 99/492, 510, 348, 511; 241/36, 37.5, 92; 366/205, 601
See application file for complete search history.

(56) References Cited

U.S. PATENT DOCUMENTS

| | | | | |
|---|---|---|---|---|
| 4,629,131 A | * | 12/1986 | Podell | 241/36 |
| 6,037,580 A | * | 3/2000 | Renk | 250/221 |
| 6,218,949 B1 | * | 4/2001 | Issachar | 340/624 |
| 6,629,492 B1 | * | 10/2003 | Li | 99/337 |
| 6,776,086 B1 | * | 8/2004 | Chang Chien | 99/492 |

* cited by examiner

*Primary Examiner*—Reginald L. Alexander
(74) *Attorney, Agent, or Firm*—Lawrence Cruz; Steven A. Garner

(57) ABSTRACT

An optical safety interlock is provided for operating a control circuit or control switch that enables operator activation of an electrical appliance such as a food processor. The optical interlock has an emitter for emitting a signal, a detector for detecting the emitted signal, a reflector for relaying the emitted signal to the detector, and an actuator for selectively positioning the reflector in two or more positions. The emitter, detector, and reflector cooperate to close the control switch when the safety interlock is satisfied. The actuator cooperates with the reflector to selectively satisfy the safety interlock.

12 Claims, 5 Drawing Sheets

OPTICAL INTERLOCK FOR APPLIANCE

BACKGROUND OF THE INVENTION

1. Field of the Invention

The present invention relates to appliances with safety interlock systems. More particularly, the present invention relates to a light sensor safety lock for cooperating with any of a variety of appliances such as, for example, a food processor.

2. Description of the Prior Art

Appliances for performing preparing/processing food are well known. A food processor, for example, is commonly used to prepare food by mixing, grinding, chopping, slicing, grating, shredding, or by a variety of other processing operations. Typically, these appliances include a working bowl that cooperates with a variety of different food processing tools via an operating and/or control base to perform a corresponding variety of different food processing operations as required by an operator of the appliance.

A removable cover is typically used to cover or seal the working bowl during operation of the appliance. The cover can have any of a variety of different configurations. For example, food processor covers frequently have a feed tube for introducing food items to be processed through the cover into the working bowl. An accessory is often used to push foods to be processed through the tube into engagement with a processing tool. The accessory is usually slidingly inserted into the feed tube.

It is also known to provide these appliances with a safety interlock that function to prevent the appliance from operating until the cover is properly positioned and/or secured to the working bowl. While the interlock can be performed in a variety of ways, it is common to use a vertically movable rod that is positioned in a channel on a side of the working bowl, and that is spring-biased toward an upper end of the channel. When the working bowl is properly positioned and/or secured to safely cooperate with the operating and/or control base, the rod is aligned with an actuator such that when the cover is properly positioned and/or secured to the working bowl, the actuator is depressed against the force of the spring to operate an interlock switch.

If the appliance has an enlarged feed tube, the pusher or a feed tube cover is often provided and connected into the interlock assembly so that the appliance cannot be operated unless the pusher or feed tube cover is also secured in its proper position. For operation with the pusher or feed tube cover, a second interlock activating rod can be positioned in a channel on the bowl cover so that the two interlock rods are aligned with one another to extend an operating cam to activate the interlock switch of the appliance.

Normally, the interlock rods are recessed and protected by a portion of the bowl and/or bowl cover. However, the rods can be extended while the bowl or cover is separated from the appliance. Thus, if the rods are extended so as to be unprotected, they can be vulnerable to damage (e.g., being snapped off during handling), which can result in the need to replace the working bowl and/or cover.

An additional drawback associated these conventional interlock rods is that debris from the processed food can get into the interlock rods to discolor and/or sully them. Since these rods cannot be easily and/or thoroughly cleaned, the contamination can interfere with the proper operation of the interlocks. Moreover, this contamination can lead to the growth of mold, bacteria and the like, which can have a negative effect not only on the appearance of the appliance food processor, but in addition can create health concerns.

Accordingly, there is a need for an improved safety interlock for operating a control switch in an appliance and that eliminates the above noted drawbacks associated with convention interlock assemblies.

SUMMARY OF THE INVENTION

It is an object of the present invention to provide an improved safety interlock for operating a controller that enables the operation of an appliance.

It is another object of the present invention to provide an improved safety interlock that is actuated via an independent tool.

It is still another object of the present invention to provide an improved safety interlock that is more reliable, economical, efficient and/or effective.

In accordance with the objects and advantages of the present invention, the optical interlock generally has an emitter for emitting a signal, a detector for detecting the emitted signal, an angled reflector for selectively relaying the emitted signal from the emitter to the detector, and an actuator for selectively positioning the reflector. The optical interlock of the present invention can cooperate with any of a variety of food preparation appliances. The optical interlock of the present invention is preferably most effective when used in association with an appliance that has a working bowl cooperative with an operating and/or control base, and a cover cooperative with the working bowl.

The above and other objects, advantages, and benefits of the present invention will be understood by reference to following detailed description and appended sheets of drawings.

DETAILED DESCRIPTION OF THE INVENTION

Figure 1:
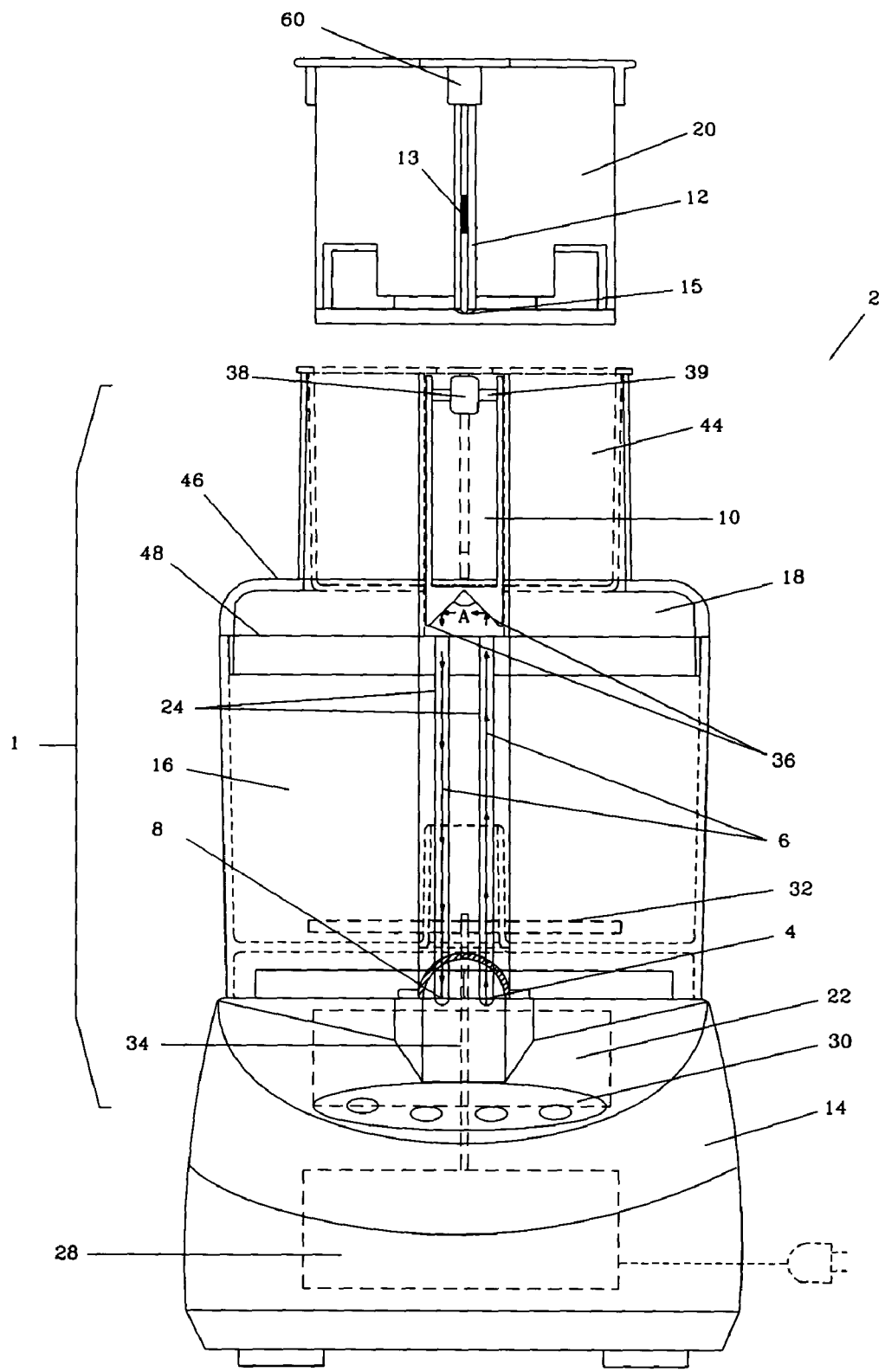
FIG. 1 is a front view of an appliance with an optical interlock in accordance with an illustrative embodiment of the present invention.

Referring to the drawings, and in particular to FIG. 1, there is shown an illustrative embodiment of an improved optical safety interlock generally represented by reference numeral 1. The optical interlock 1 can operate a control switch that enables operator activation of an electrical appliance. The optical interlock 1 is shown for illustrative purposes in association with a food processing appliance 2.

Figure 2:
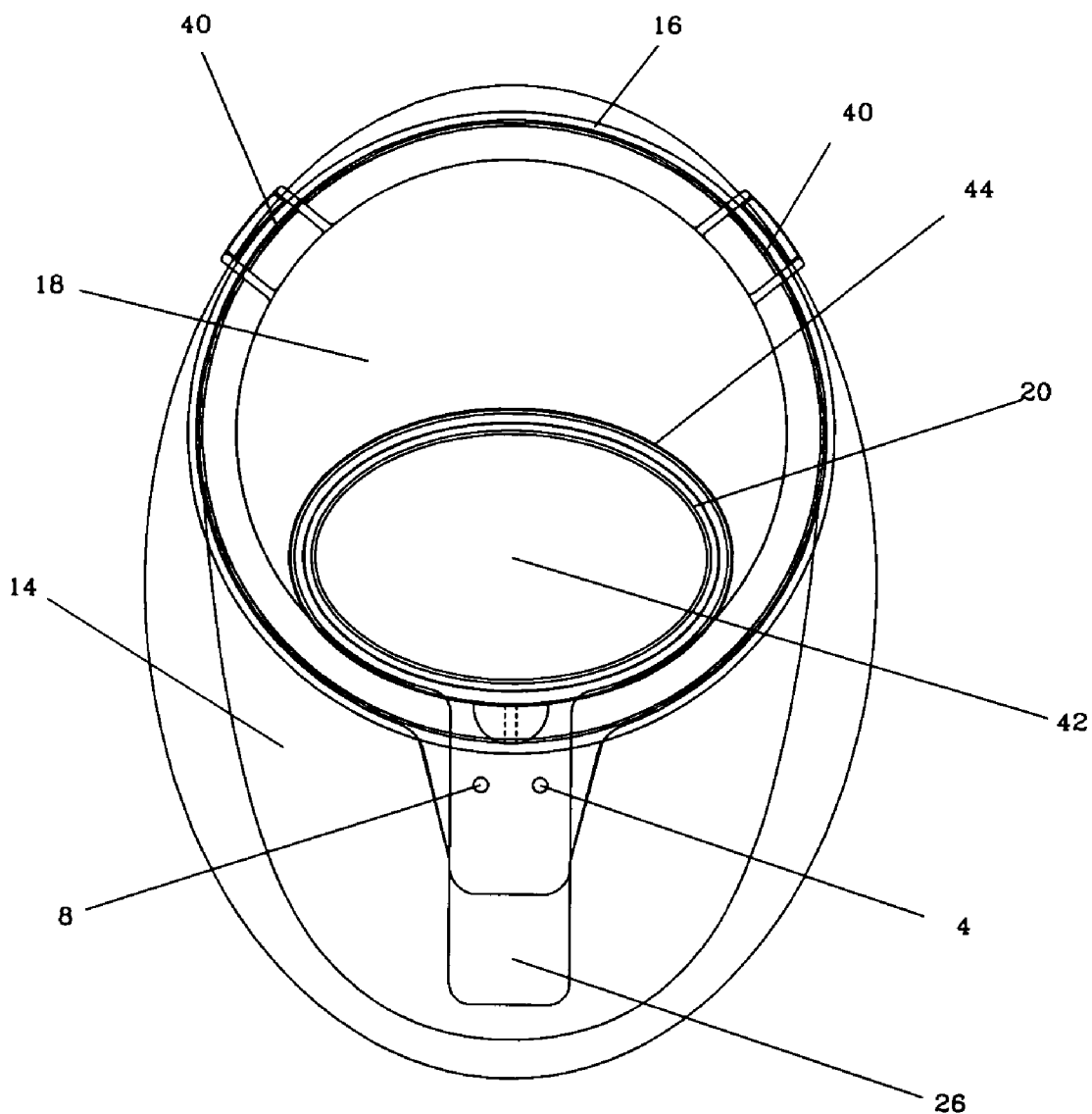
FIG. 2 is a top view of the appliance of FIG. 1.

Referring to FIGS. 1 and 2, appliance 2 generally has a control and/or operating base 14, a container or work bowl 16 for cooperating with base 14, a cover 18 for cooperating with work bowl 16, and an accessory 20 for cooperating with cover 18.

It is noted that the optical interlock 1 can be associated or operatively connected with a variety of different electrical appliances.

Optical interlock 1 generally has at least one emitter 4 for emitting a signal 6, such as an optical or infra-red signal, at least one detector 8 for detecting signal 6, at least one reflector 10 for relaying signal 6 from emitter 4 to detector 8, and at least one actuator 12 for selectively positioning reflector 10.

Emitter 4 is preferably a diode associated with base 14 and either directly or indirectly operatively connected to a control circuit or switch 22 in base 14. Control switch 22 is preferably associated with a power source (not shown) and can be of any suitable configuration to cooperate with, and control and/or manipulate the various component parts associated with the appliance 2. Emitter 4 is preferably situated either in and/or on base 14 so as to be able to effectively emit signal 6 away from base 14 so that signal 6 can interact or communicate with any of a variety of other appliance component parts that are separate from base 14.

Detector 8 is preferably an optical sensor suitable to receive, read and/or translate signal 6 from emitter 4. Detector 8 is also preferably either directly or indirectly operatively connected to control switch 22 in base 14. Detector 8 is preferably situated either in and/or on base 14 so as to be able to effectively detect signal 6 emitted by emitter 4. Thus, when emitter 4 and detector 8 interact or communicate via signal 6, control switch 22 is satisfied or activated such that the appliance, like appliance 2 is ready for use and may be operated.

Emitter 4 and detector 8 are preferably situated in close proximity and are cooperative with one or more guides 24 that channel signal 6. Guides 24 are preferably associated with work bowl 16. Guides 24 can be of any form or configuration from one or more plastic tubes to one or more optical fibers. Guides 24 can be routed in any of a variety of directions via work bowl 16.

Work bowl 16 is preferably of sufficient size to accommodate a wide variety of different types of matter or substances in a variety of shapes, sizes or forms. Work bowl 16 can have a handle 26, as shown in FIG. 2, through which guides 24 may be passed as desired. Work bowl 16 and base 14 preferable cooperate to process a wide variety of different substances. Base 14 preferably has a motor 28 controlled or manipulated by a panel 30 and/or control switch 22. Work bowl 16 can preferably also accommodate one or more processing tools 32 of various shapes, sizes or configurations. Processing tools 32 preferably cooperate with motor 28 via a shaft 34 passing through work bowl 16. Work bowl 16 can also have any of a variety of forms, shapes, or configurations suitable for cooperating with one or more different appliances and for accomplishing a variety of different processing operations.

Reflector 10 is preferably a moving member having at least one reflecting surface 36 associated therewith. However, reflector 10 can also have any of a variety of other forms and/or configurations suitable for relaying signal 6 from emitter 4 to detector 8. In one aspect of the present invention, reflecting surface 36 is bent at an angle A of preferably about 90 degrees, most preferably 90 degrees plus or minus manufacturing tolerances. In another aspect of the present invention, reflecting surface 36 can be cooperative with one or more additional reflecting surfaces (not shown) to effectively redirect signal 6 from emitter 4 to detector 8 in a variety of different configurations. Angle A plays an important role in the effectiveness of optical interlock 1, which role will be discussed in more detail hereafter.

Reflector 10 is preferably cooperative with actuator 12 via a contacting element 38. Contacting element 38 can be any of a variety of structures, such as for example, a roller or a cam. Contacting element 38 is preferably either directly or indirectly connected to reflector 10 and is suitable to cause reflector 10 to move in response to an interaction with actuator 12. Reflector 10 can preferably be positioned in any of a number of different positions. Reflector 10 can also be either directly or indirectly associated with cover 18.

Cover 18 preferably cooperates with work bowl 16. Cover 18 can preferably be separably connected with work bowl 16 in any of a variety of ways. For example, cover 18 and work bowl 16 can be threadably engaged and threadably disengaged, or cover 18 can be removably mounted to work bowl 16 via one or more connectors 40 shown in FIGS. 2 through 4. Further, it is noted that cover 18 can have any of a variety of forms, shapes, sizes or configurations suitable for cooperating with one or more different appliances.

Referring to FIGS. 1 and 2, cover 18 preferably has an opening 42 formed therein. Opening 42 is preferably of sufficient size to accommodate the processing of a wide array of different types of substances. Further, opening 42 can be of various different sizes, shapes or configurations suitable for accomplishing a variety of different preliminary preparations to a substance prior to any processing via the appliance such as food processor 2. Preferably, opening 42 can also cooperate with an accessory 20 to provide even further flexibility in the use and/or application of the appliance.

Accessory 20 can preferably have any of a variety of different shapes, sizes or configurations suitable for complimenting or facilitating a variety of different preliminary processing operations or preparations. Accessory 20 can cooperate with opening 42 via a hollow tube or chute 44 extending from cover 18 either from an upper outer surface 46 of cover 18 or from an inner lower surface 48 of cover 18. Accessory 20 and/or opening 42 can be adjustable. For example, opening 42, when in the form of chute 44, can be raised and/or lowered telescopically. Opening 42 can also be enlarged and/or collapsed diametrically in size. Also, opening 42 can be similarly adjusted via accessory 20. Thus, accessory 20, opening 42 or both, can be selectively positioned or adjusted to facilitate a variety of different operations.

Accessory 20 is preferably either directly or indirectly associated with actuator 12 so as to selectively interact with opening 42 and optical interlock 1 simultaneously. In another aspect of the present invention, actuator 12 is associated with cover 18. However, in a preferred aspect of the present invention, actuator 12 is connected to accessory 20 such that when the accessory cooperates with cover 18 via opening 42, actuator 12 interacts or cooperates with reflector 10. This interaction preferably causes reflector 10 to be moved or adjustably positioned. Actuator 12 can preferably have any of a variety of different shapes, sizes or configurations suitable for cooperating with optical interlock 1 to satisfy or activate the interlock such that appliance 2 is ready for use and may be operated.

Having described some of the preferred aspects of an illustrative embodiment of the present invention, the operation of optical interlock 1 will now be discussed.

Figure 3:
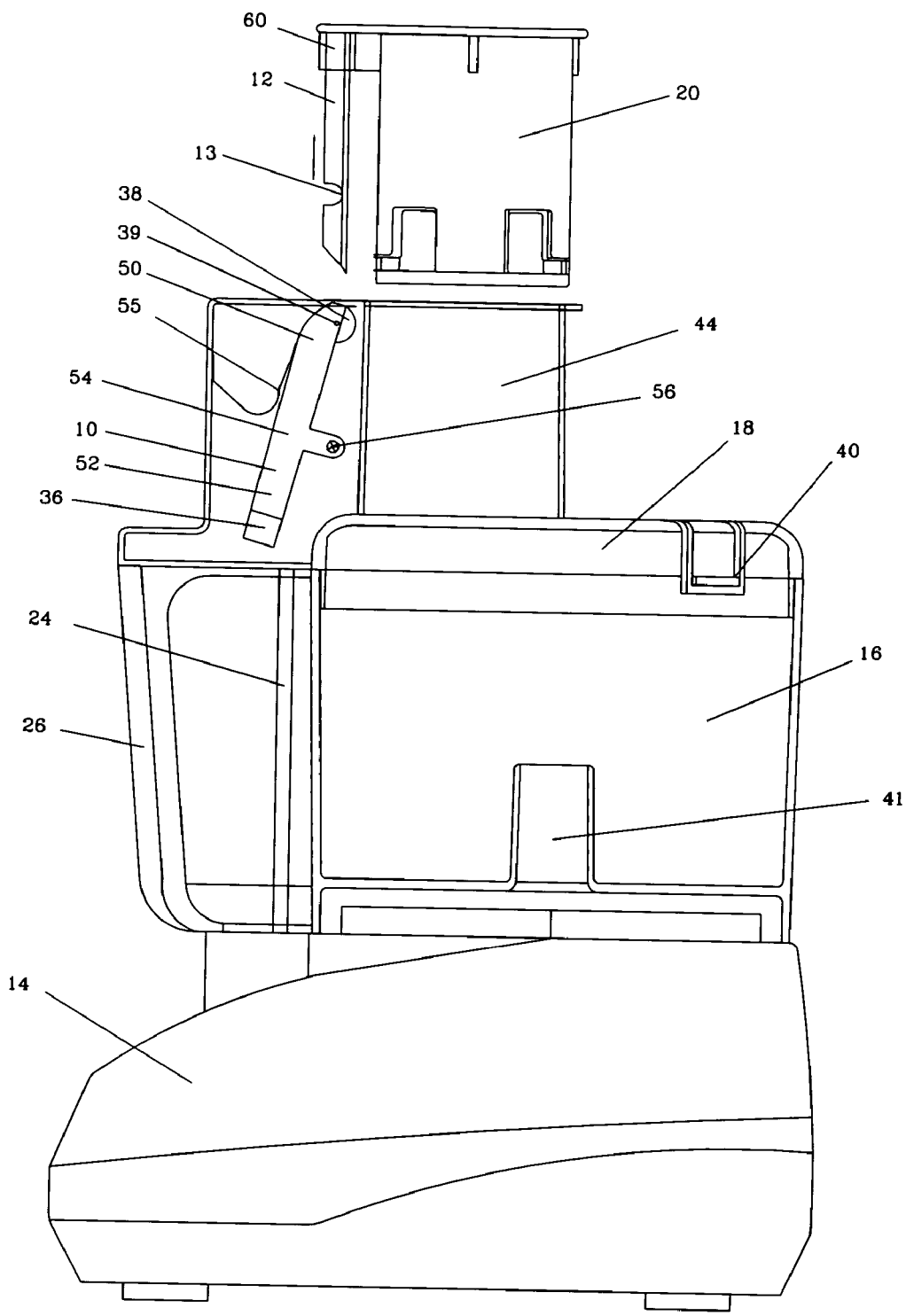
FIG. 3 is a first side view of the appliance of FIG. 1 showing the optical interlock in a first state.

Referring to FIG. 3, base 14, bowl 16 and cover 18 are shown properly positioned in relation to one another, while accessory 20, with actuator 12 associated therewith, is shown separated or disengaged from cover 18. In this disengaged state, reflector 10 is preferably biased to a first position in which reflecting surface 36 is in a non-reflecting mode. In this illustrative aspect of the present invention, reflector 10 is an elongated member with a first end 50 cooperative with contacting element 38 associated therewith, a second end 52 having reflecting surface 36 associated therewith, and an intermediate portion 54 that is pivotally connected to cover 18 via a pin 56.

Figure 4:
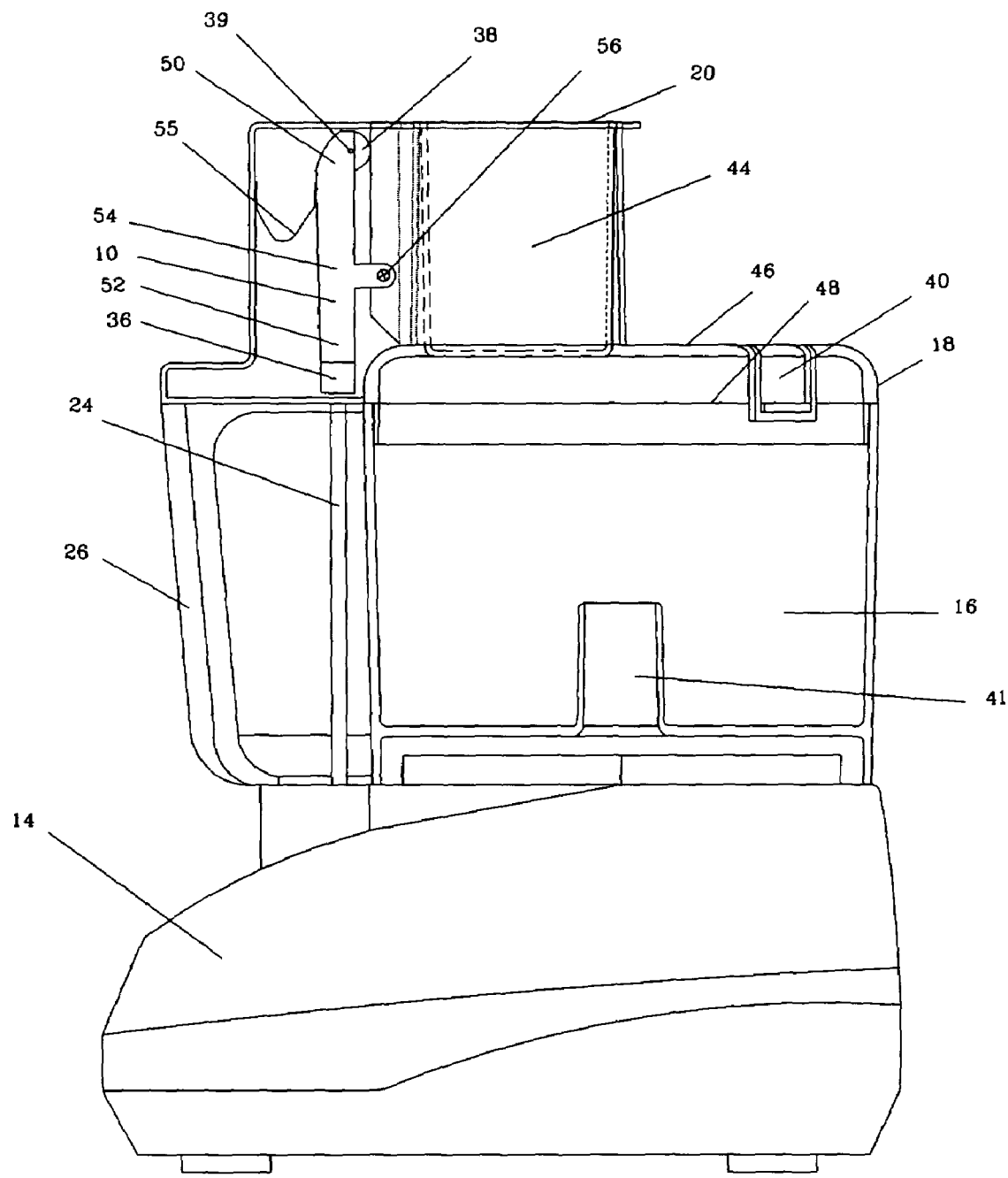
FIG. 4 is a second side view of the appliance of FIG. 1 showing the optical interlock in a second state.

Referring to FIG. 4, accessory 20 is shown engaged or properly positioned in relation to cover 18. Cover 18, bowl 16 and base 14 are likewise properly engaged or positioned with respect to each other. In this engaged state, actuator 12 directly or indirectly causes reflector 10 to move to a second position in which reflecting surface 36 is in a reflecting mode. In this aspect of the present invention, actuator 12 preferably interacts with contacting element 38 to cause reflector 10 to pivot about pin 56 and to bring reflecting surface 36 into a position suitable to relay signal 6 from emitter 4 to detector 8 as shown in FIG. 1.

Figure 5:
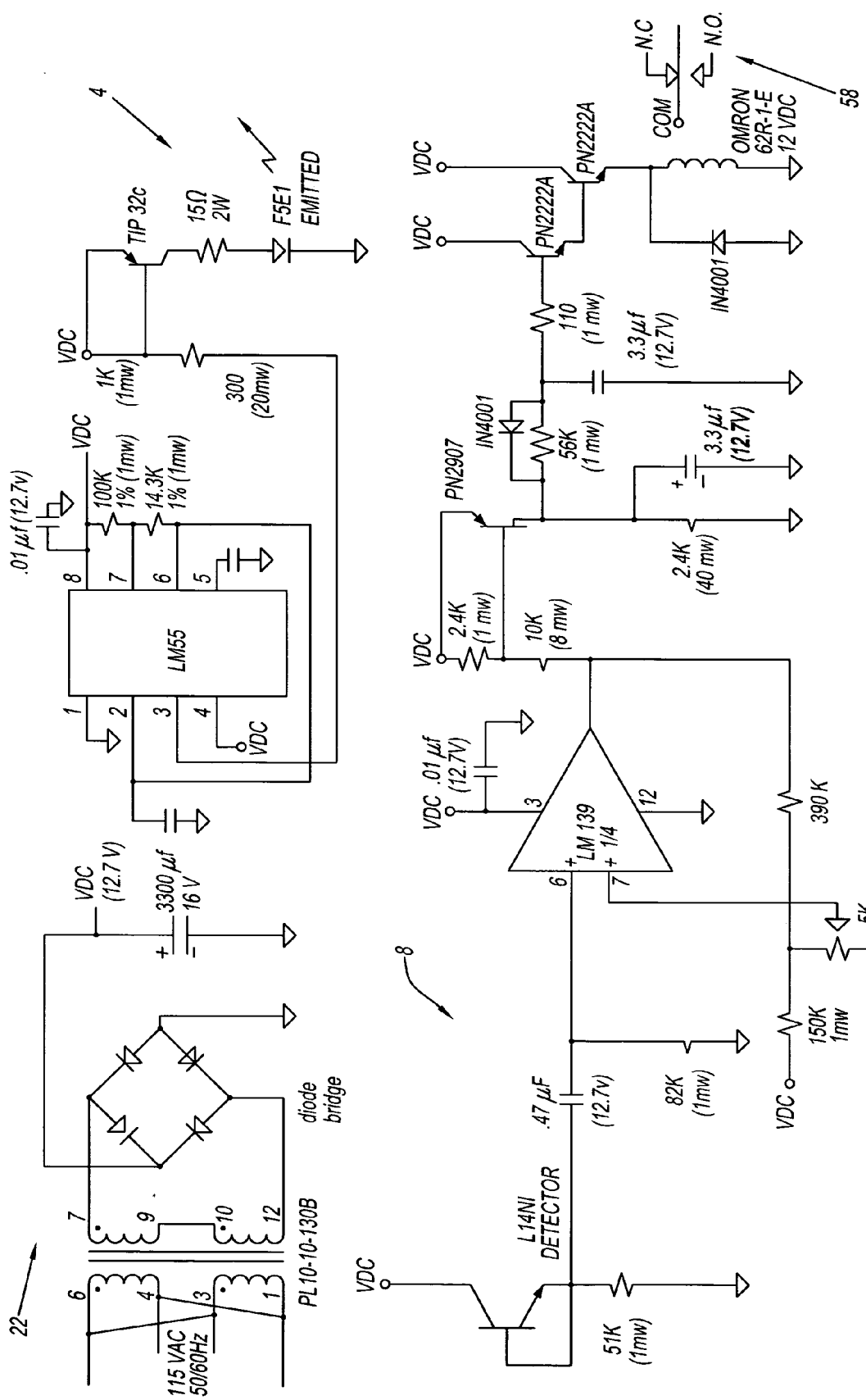
FIG. 5 is a schematic diagram of a control circuit in accordance with an illustrative embodiment of the present invention.

Referring to FIG. 5, an illustrative configuration of the circuitry for control switch 22 of FIG. 1 is shown. It is noted that the circuitry for control switch 22 can have a variety of different configurations and/or components. As is shown in FIG. 5, emitter 4 and detector 8 are preferably associated with control switch 22, and control switch 22 is also preferably operatively connected to a power switch 58, which can be inherently in either an operative or inoperative state. The operative state preferably allows the appliance to operate and the inoperative state prevents such operation of the appliance. Preferably, when signal 6 from emitter 4 is received and/or read by detector 8, control switch 22 is completed and power switch 58 is put into the operative state to allow for the operation of the appliance. In contrast, preferably when signal 6 from emitter 4 is prevented from being received and/or read by detector 8, control switch 22 is incomplete and power switch 58 is left in an inoperative state.

Thus, the appliance preferably remains inoperative until accessory 20 engages opening 42 of cover 18 thereby preventing entry of a hand or an undesirable foreign object through the cover 18 into the work bowl 16. Once accessory 20 is properly engaged with opening 42, optical interlock 1 is satisfied and the appliance can be operated. When accessory 20 is removed and/or separated from opening 42, optical interlock 1 is disengaged or deactivated and the appliance becomes inoperative once again.

It is to be noted that the accessory 20 preferably can have a stop 60 as shown in FIG. 1, to facilitate the proper engagement between accessory 20 and cover 18. When accessory 20 has been fully inserted stop 60 seats down upon cover 18 so as to later serve as or provide a handle or grasping tool for conveniently removing/separating or manipulating accessory 20 with respect to cover 18.

The present invention having been thus described with particular reference to the preferred forms thereof, it will be obvious that various changes and modifications may be made therein without departing from the spirit and scope of the present invention as defined herein. In addition, it is believed that the many advantages of this invention and the manner in which it fulfills the stated objectives will be understood by those skilled in the art.

What is claimed is:

1. An interlock for an appliance, comprising:
   an emitter for emitting a signal;
   a detector for detecting said emitted signal;
   a reflector for relaying said emitted signal from said emitter to said detector; and
   an actuator for selectively positioning said reflector in two or more positions,
   wherein the interlock is operatively connected with a food processing appliance having at least control/operating base, a working bowl that cooperates with said control/operating base, and a cover that cooperates with said working bowl, wherein said reflector is operatively connected with said cover and/or said working bowl, and wherein said cover has an opening for introducing food items to be processed through said cover into said working bowl.

2. The interlock of claim 1, further comprising an accessory cooperative with said opening of said cover.

3. The interlock of claim 2, wherein said actuator is operatively connected with said accessory.

4. The interlock of claim 3, wherein at least one of said two or more positions is a reflecting position in which said reflector relays a signal from said emitter to said detector.

5. The interlock of claim 4, wherein at least another of said two or more positions is a non-reflecting position in which said reflector is unable to relay said emitted signal from said emitter to said detector.

6. The interlock of claim 5, wherein said reflector can relay said emitted signal from said emitter to said detector, which satisfies the interlock and allows a food processing appliance to be operated when said reflector is in said reflecting position.

7. An appliance comprising:
   a control and/or operating base;
   a working bowl for cooperating with said control and/or operating base;
   a cover for cooperating with said working bowl; and
   an optical interlock cooperative with said control and/or operating base, said working bowl, and said cover,
   wherein said control and/or operating base has one or more optical emitters for emitting an optical signal and one or more optical detectors for detecting said optical signal and wherein said working bowl has two or more guides for channeling said optical signal.

8. The appliance of claim 7, wherein said cover has a reflector for relaying said optical signal from said emitter to said detector.

9. The appliance of claim 8, wherein said reflector has an angled reflective surface.

10. A food processor comprising:
    a control/operating base;
    a working bowl operatively connectable to said control/operating base;
    a cover separably connectable to said working bowl; and
    an optical interlock cooperative with said control/operating base, said working bowl, and said cover,
    wherein said control and/or operating base has one or more optical emitters for emitting an optical signal and one or more optical detectors for detecting said optical signal, and wherein said working bowl has two or more guides for channeling said optical signal, and wherein said cover has a reflector for relaying said optical signal from said emitter to said detector.

11. The appliance of claim 10, wherein said reflector has an angled reflective surface.

12. The food processor of claim 11, wherein said angled reflective surface has an about 90 degree bend.

* * * * *